UNITED STATES PATENT OFFICE.

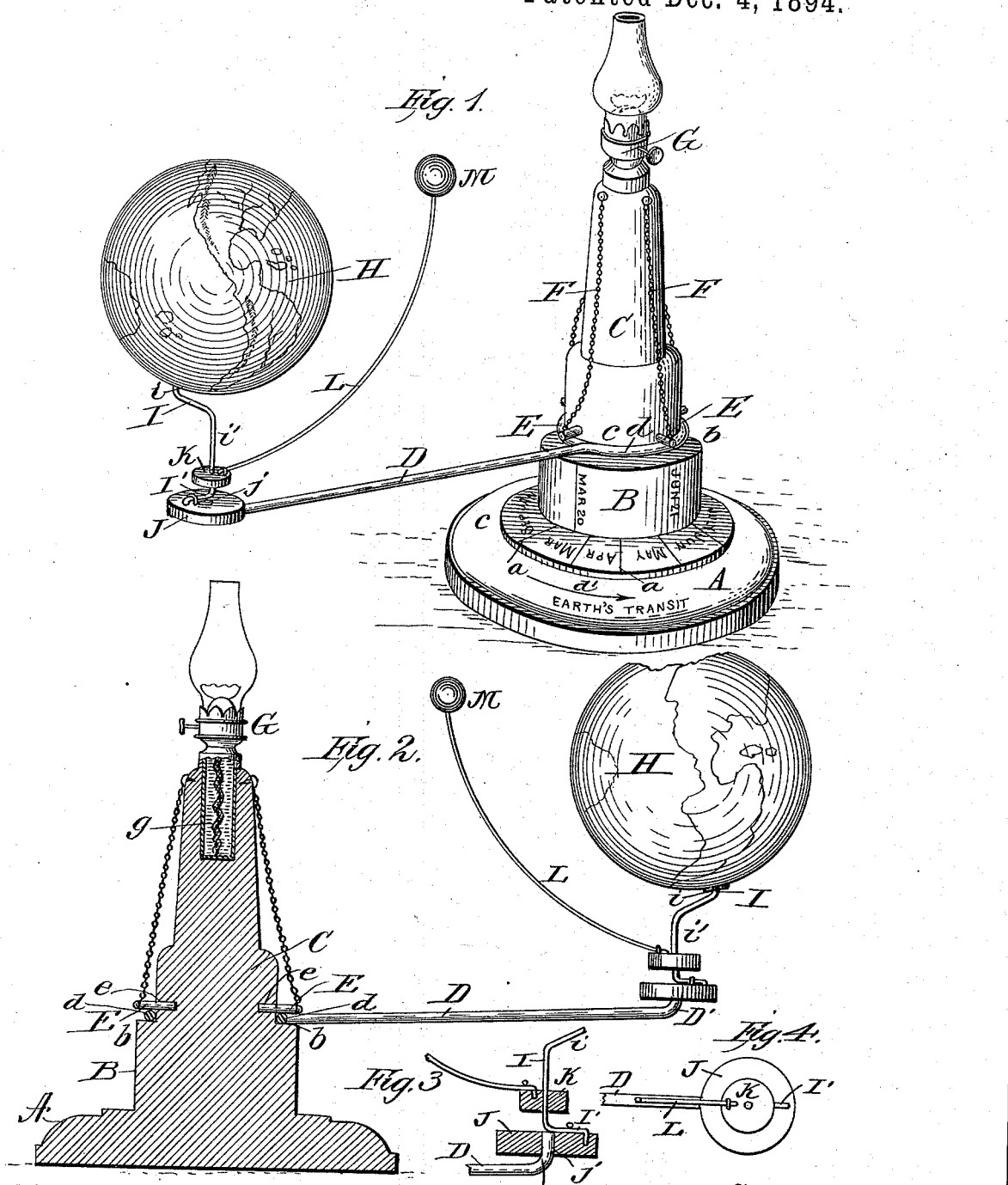

ANNETTA PATTON, OF STEVENSVILLE, PENNSYLVANIA.

EDUCATIONAL APPLIANCE.

SPECIFICATION forming part of Letters Patent No. 530,450, dated December 4, 1894.

Application filed June 18, 1894. Serial No. 514,888. (No model.)

*To all whom it may concern:*

Be it known that I, ANNETTA PATTON, a citizen of the United States, and a resident of Stevensville, in the county of Bradford and State of Pennsylvania, have invented certain new and useful Improvements in Educational Appliances; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my educational device or appliance for teaching astronomical geography. Fig. 2 is a sectional view of the same, on a vertical plane through the middle of the lamp-supporting standard, pedestal, and base. Fig. 3 is a sectional view of the rotatable disks, which support the globes representing the earth and moon, at the outer end of the horizontal arm; and Fig. 4 is a plan or top view of the same.

Like letters of reference designate corresponding parts in all the figures.

This invention relates to educational appliances or apparatus for teaching astronomical geography—that is to say, a device in the nature of an orrery, but without the clockwork for operating the spheres which represent the sun, earth, and moon in order to illustrate the revolution of the moon around the earth, and the earth around the sun. Such appliances, involving the use of complicated mechanism, are not only necessarily expensive, so as to bring them beyond the means of ordinary public schools and private educational institutions of moderate means; but they are liable to get out of order and become disarranged.

The object of my invention is to construct an appliance or apparatus for teaching astronomical geography, which shall be so simple as to bring it within reach of the great majority of schools and educational institutions, and yet be adapted to illustrate and explain, by object-lessons, the salient points in astronomical geography; and my invention, therefore, consists in the novel and specific construction and combination of parts of an apparatus or appliance which is adapted to represent, in a very simple manner, the co-relations of the earth, sun, and moon, in a way that will illustrate to pupils the cause of the phenomena which we call day and night; of the variations in the length of the day and night; of the changes in the seasons, together with the tides and the phases of the moon, &c.

This apparatus consists of a circular base A, supporting a central pedestal B, which, in turn, supports a central post or upright C, the cylindrical base $c$ of which is of less diameter than the flat top of the pedestal B, so as to leave a circular ledge or shoulder $b$, which forms a bearing or support for the ring $d$ at the inner end of the horizontal globe-supporting rotatable arm or bracket D. This bracket, with its ring $d$, is held in place, movably, and removably, upon the ledge $b$ of pedestal B by means of keepers E E (preferably four in number); each of which consists simply of a peg of wood or other suitable material which fits into a horizontal bore $e$ in the lower cylindrical base of the upright C, at such a distance above the projecting ledge $b$ of the pedestal that there shall be room enough between said ledge and the projecting overlapping ends of the pegs or keepers E E for the bracket-ring $d$ to revolve freely upon the circular bearing ledge $b$ around the central standard.

When it is desired to take the apparatus apart, for shipment or storage, the bracket D bracket ring $d$ can easily be detached from the central standard and base simply by pulling the pegs E E out of their respective apertures, and then slipping ring $d$ off the upright C, over the top of the same. In order to prevent the keepers E E from getting lost, each one is connected by a small chain, F, to the upper end of the central standard C. The top of this standard is recessed or hollowed out to contain the oil-reservoir $g$ of a small lamp G, which is placed on the top of the standard and is intended to represent the sun. The earth is represented by a globe, H, which revolves upon an inclined axis I, the lower end of which is bent at right angles to form a shoulder or support $i$ for the under side of the globe. The wire I, which constitutes the axis, is then again bent downwardly, or at right angles to the bracket-arm D, as shown at $i'$ and is finally bent at right angles to form an elbow I' which is fastened upon the top of a flat disk J, having a central aperture $j$ for the insertion of the outer bent end D' of arm D.

Upon the vertical part $i'$ of the axis wire I is placed a smaller rotatable disk K, which supports a curved wire arm L, the outer end of which carries a small sphere M, representing the moon. By rotating the disk K upon its central wire-support $i'$, the moon sphere M may be revolved around the globe representing the earth, to which it will always present the same side. This combination and arrangement permits of three separate and independent motions of the globe representing the earth, viz: first, around its inclined axis; second, the turning of the inclined axis I so as to adjust its inclination to the proper direction, and third, turning the globe, with the arm D, around the central pedestal and upright upon which the lamp representing the sun is placed. By rotating the small disk K, the sphere M, which represents the moon, may be placed between the lamp representing the sun, and the globe representing the earth, so as to illustrate the phenomena of the moon's phases.

The flat top of the circular base A has marked upon it, around the central pedestal B, the names of the twelve months in the year, commencing with "January" and ending with "December;" said circular top being divided, by the equidistant radial lines $a\ a$, into twelve sections, each inscribed with its appropriate month. The earth's orbit is indicated by small arrows, $d'$ marked on the rim of the base; and the dates of the beginning of the four "seasons," viz: (March 20, June 21, September 22, December 21) are indicated by vertical lines $c\ c$ equidistant from one another, marked off on the sides of the cylindrical pedestal B.

To use the apparatus after it has been put together, as represented in Fig. 1, the lamp G should be lighted and the room darkened, extend the bracket arm D westwardly, and turn disk J until the axis wire I of the earth H, inclines toward the north. The apparatus will then represent the earth in its position in its orbit at the commencement of the astronomical year, March 20; the central base and pedestal being rotated until the vertical line $c$ marked "March 20;" shall be in alignment with arm D, which as we have seen, points to the west, with the axis of the earth inclined due north, as on that day. The pupils will now see that the earth receives its light and also heat from the sun. They will see that since the sun can illumine but one-half of a sphere at the same time, that one-half of the earth is in darkness and would so remain had the earth no motion; but since it rotates on its axis once in about every twenty-four hours, any part of the earth will be in darkness but one-half of that time—that is on March 20, for since the inclination of the earth's axis to the plane of its orbit is to the north, it is then inclined neither to nor from the sun.

Therefore, the sun's rays are vertical at the equator, and as they will extend ninety degrees in all directions, the great circle of illumination, which divides the dark portion from the light, will coincide with a meridian circle, and one-half of every parallel of latitude will then be illumined by the sun; and as the length of day on any parallel will equal or exceed the night in proportion as the light part of that parallel equals or exceeds the dark, and vice versa, day and night must then be equal. Now move the globe onward in its orbit, and as it proceeds from March 20 to September 22, when it shall have made one-half of its revolution around the sun, it will be seen that during that time more than one-half of the Northern Hemisphere has been illumined, owing to the inclination of the earth's axis to the north, which has necessarily inclined the Northern Hemisphere to the sun. Hence, during this time, the day in that portion of the earth will exceed the night according to the rule above given, the greatest excess occurring on June 21, when the earth is at its summer solstice, with the rays of the sun reaching nearly twenty-three and a half degrees beyond the north pole. At this date the length of the day at the Arctic Circle is twenty-four hours, and corresponds with the length of the night at the Antarctic Circle.

Since the sun can illumine but one-half of the earth at one time, it will be seen that more than one-half of the southern hemisphere has been in darkness during the time above-mentioned, from March 20 to September 22. Therefore, the length of the night in the Southern Hemisphere has exceeded that of the day. During the remainder of the astronomical year, from September 22 to March 20, the same phenomenon will be observed, only vice versa.

Similarly, the apparatus may be used to illustrate and explain the cause of the change in the seasons; modifications in the astronomical climate; the causes of the phases of the moon; eclipses, and the cause of the tides; and other phenomena which admits of illustration by such an apparatus.

It will be observed that this appliance, being entirely devoid of clockwork or other delicate mechanism, is not liable to become deranged or get out of order; that it can be taken apart and put together again in a few moments; and that, due to the simplicity of its construction, it can be manufactured and sold at a very reasonable cost, so as to bring it within the reach of public schools and private educational institutions of moderate resources.

Having thus described my invention, I claim and desire to secure by Letters Patent of the United States—

The herein-described educational appliance for teaching astronomical geography, comprising the following co-operating elements constructed and combined substantially as described, viz: a circular base A provided with the central cylindrical pedestal B having a central upright or standard C of reduced diameter and provided with a series of radial apertures e e and with pegs E E, adapted to fit into said apertures and attached to the standard by chains; a lamp fastened to the top of the central standard; the bracket arm D having a ring d, at its inner end; rotatable disk J, upon the outer end of said bracket arm; the wire I attached to the disk J; the earth globe H supported by said wire; the rotatable disk K, also supported on the wire I; the bracket arm D, attached to the disk K and the moon globe M fastened to the end of the bracket arm D, all constructed and combined to operate, substantially as and for the purpose herein shown and described.

In testimony that I claim the foregoing as my own I have hereunto affixed my signature in presence of two witnesses.

ANNETTA PATTON.

Witnesses:
W. H. MATSON,
A. S. BALDWIN.